US009524351B2

(12) United States Patent
Dickens et al.

(10) Patent No.: US 9,524,351 B2
(45) Date of Patent: Dec. 20, 2016

(54) REQUESTING, RESPONDING AND PARSING

(75) Inventors: Thomas Dickens, Bothell, WA (US);
Manoj Sivakumar, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 435 days.

(21) Appl. No.: 13/044,626

(22) Filed: Mar. 10, 2011

(65) Prior Publication Data
US 2012/0233241 A1    Sep. 13, 2012

(51) Int. Cl.
*G06F 15/16*    (2006.01)
*G06F 17/30*    (2006.01)

(52) U.S. Cl.
CPC ... *G06F 17/30902* (2013.01); *G06F 17/30893* (2013.01)

(58) Field of Classification Search
CPC .... H04L 67/02; H04L 67/306; H04L 63/0876; H04L 63/1466; H04L 67/2823; H04L 67/32; H04L 69/329; H04L 29/06; H04L 67/2842; H04L 67/1002; H04L 67/42; H04L 67/10; H04L 61/1511; H04L 67/28; H04L 29/12066
USPC ......................... 709/201, 202, 203, 219, 231
See application file for complete search history.

(56) References Cited

U.S. PATENT DOCUMENTS

| | | | |
|---|---|---|---|
| 6,601,142 B2 | 7/2003 | Cox et al. | |
| 6,772,199 B1 * | 8/2004 | Keller et al. | 709/213 |
| 7,054,917 B1 * | 5/2006 | Kirsch et al. | 709/217 |
| 7,627,648 B1 * | 12/2009 | Mehta et al. | 709/217 |
| 7,730,154 B2 | 6/2010 | Agarwalla et al. | |
| 2002/0007404 A1 | 1/2002 | Vange et al. | |
| 2002/0091798 A1 * | 7/2002 | Joshi et al. | 709/219 |
| 2002/0120727 A1 * | 8/2002 | Curley et al. | 709/223 |
| 2003/0188021 A1 | 10/2003 | Challenger et al. | |
| 2004/0128346 A1 * | 7/2004 | Melamed et al. | 709/203 |
| 2004/0167961 A1 | 8/2004 | Jain et al. | |
| 2006/0064467 A1 | 3/2006 | Libby | |
| 2009/0204682 A1 * | 8/2009 | Jeyaseelan et al. | 709/217 |
| 2010/0017696 A1 * | 1/2010 | Choudhary et al. | 715/205 |

(Continued)

OTHER PUBLICATIONS

Haritsa, Jayant R., "Integrating Code and Fragment Caching to Speedup Dynamic Web-Page Construction", International Conference on Management of Data, 2005, http://dsl.serc.iisc.ernet.in/publications/conference/combined_caching.pdf, India.

(Continued)

*Primary Examiner* — Dustin Nguyen
*Assistant Examiner* — Thao Duong
(74) *Attorney, Agent, or Firm* — Steven Spellman; Tom Wong; Micky Minhas

(57) ABSTRACT

This disclosure relates to requesting content items of a web page, via a first request and a second request and responding to the requests. The server computer receives the first request from a client computer and responds to the first request by sending a plurality of default content items to the requesting client computer. The server computer receives the second request from the client computer and responds to the second request by sending a plurality of non-default content items to the requesting client computer. In one or more disclosed embodiments, the client computer stores the plurality of non-default content items in a cache. This disclosure also relates to parsing data in the cache.

20 Claims, 9 Drawing Sheets

(56) References Cited

U.S. PATENT DOCUMENTS

2011/0060727 A1* 3/2011 Koul et al. .................... 707/689

OTHER PUBLICATIONS

Zabir, "Client Side Page Fragment Output Cache, Reduce Page Download Time Significantly", Omar Al Zabir Blog, Aug. 10, 2006, http://omaralzabir.com/client_side_page_fragment_output_cache_reduce_page_download_time_significantly/.

* cited by examiner

590

| Current State | Found Character | Next State | Perform Actions |
|---|---|---|---|
| IsLT | / | IsLT | Clears Buffers<br>Mark as end tag<br>Report the tag<br>Scan for next "<" |
| IsLT | [Alpha Numeric] | IsStartTag | s |
| IsLT | [Everything Else] | IsLT | Scan for next "<" |
| IsStartTag | > | IsLT | Report the tag<br>Scan for next "<" |
| IsStartTag | / | IsLT | Mark as self-closing tag<br>Report the tag<br>Scan for next "<" |
| IsStartTag | [Alpha Numeric] | IsStartTag | [Nothing] |
| IsStartTag | [Space] | MaybeAttr | [Nothing] |
| MaybeAttr | > | IsLT | Report the tag<br>Scan for next "<" |
| MaybeAttr | / | IsLT | Mark as self-closing tag<br>Report the tag<br>Scan for next "<" |
| MaybeAttr | [Alpha Numeric] | MaybeAttr | Record the id attribute if present<br>Scan past two double quotes(") |
| MaybeAttr | [Space] | MaybeAttr | [Nothing] |

FIG. 6

REQUESTING, RESPONDING AND PARSING

BACKGROUND

In addition to static content, web pages typically include various types of interactive content, such as videos, slideshows, photo albums and the like. However, such interactive content tends to be large, and slows down page loading, resulting in an unpleasant user experience. To speed up loading, web pages are oftentimes separated into fragments that are loaded asynchronously at different times. However, loading fragments at different times tends to increase the number of requests from client computers to server computers to obtain the fragments, increasing network traffic and also resulting in an unpleasant user experience. "Fragment caching" may be used to speed up page loading by caching at least some of the fragments at the client computer. However, current limitations of fragment caching still result in less than desirable user experiences in many situations.

SUMMARY

Systems and methods are disclosed relating to requesting content items of a web page, via a first request and a second request and responding to the requests. The server computer receives the first request from a client computer and responds to the first request by sending a plurality of default content items to the requesting client computer. A default content item is practically any content item that can be loaded quickly, likely to be part of the visual impact of the web page or both can be loaded quickly and is part of the visual impact of the web page. The server computer receives the second request from the client computer and responds to the second request by sending a plurality of non-default content items to the requesting client computer. In one or more disclosed embodiments, the client computer stores the plurality of non-default content items in a cache. A non-default content item is practically any content item that typically cannot be loaded quickly, is not likely to be part of the visual impact of the web page or both cannot be loaded quickly and is not likely to be part of the visual impact of the web page.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The embodiments disclosed herein are better understood with reference to the accompanying figures, in which:

FIG. 6 is an example of a table of state data.

DETAILED DESCRIPTION

Figure 1:
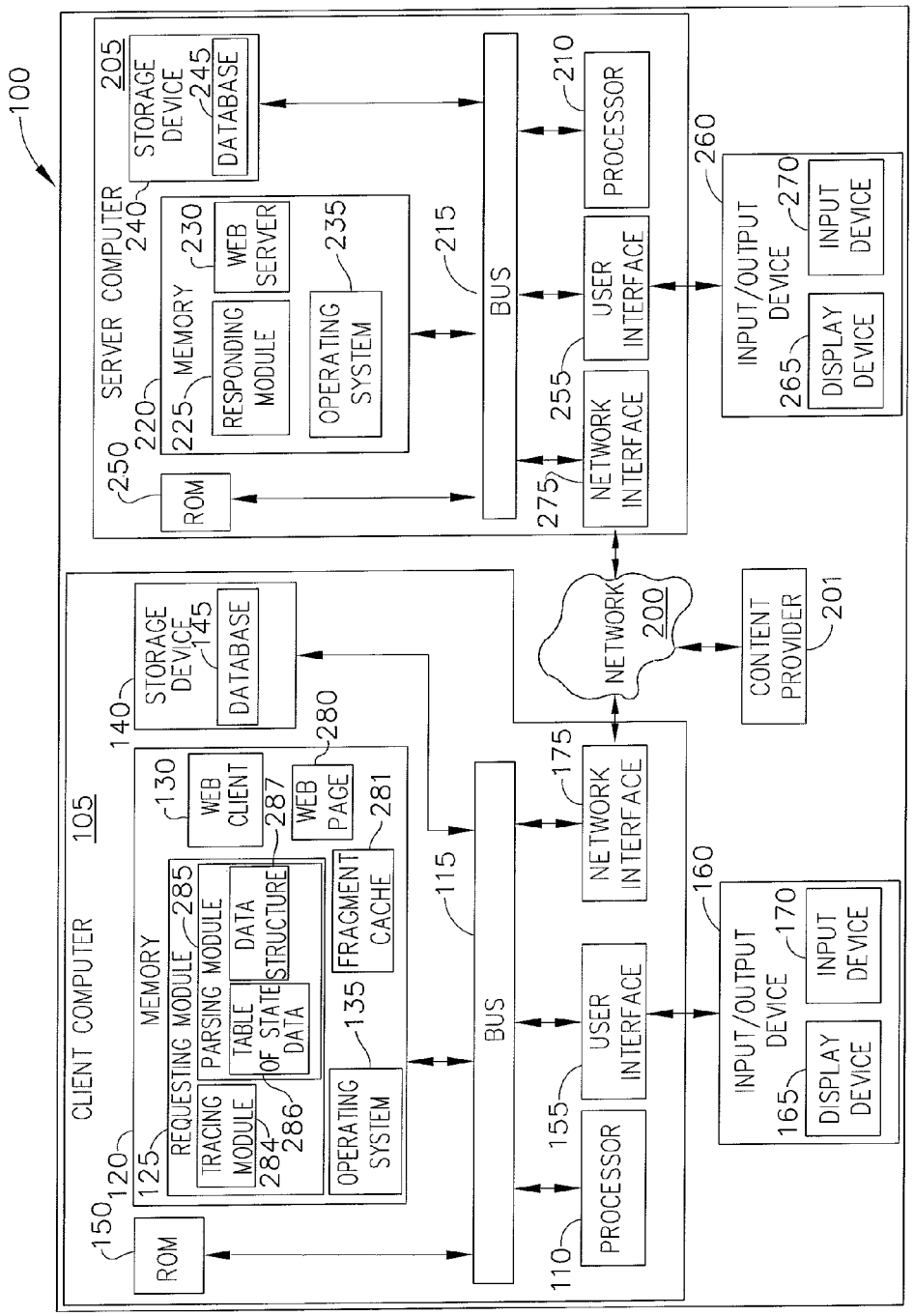
FIG. 1 is a block diagram of an example of a client-server environment for improved requesting, responding to requests and parsing.

The embodiments discussed herein relate to requesting content items for a web page by a client computer, via a first request and a second request, and a server computer responding to both requests. Each request is a single request, as opposed to multiple requests. The server computer responds with a plurality of default content items to the first single request and a plurality of non-default content items to the second single request. As such, the number of requests by the client computer to the server computer to obtain substantially all of the content items (e.g., all of the content items) of the web page may be reduced to simply two requests.

As used herein, a content item may represent practically any content of a web page, for example, a content item may include, but is not limited to text, an ad, an image, a tab and a slide of a slideshow. For simplicity, a content item is used in the singular herein, such that each slide of a slideshow is a content item while a plurality of content items may be a plurality of slides of the slideshow.

A content item is classified as default if it is likely to be part of the visual impact of the web page. For instance, users viewing a web page may expect to see certain content items when the web page is initially loaded, such as text, the first slide of a slideshow and a first tab, among others. The programmer or an editorial group may manually classify a content item of a web page as default and write the classification into the code, for example, but not limited to, a bit, a flag, and a value.

On the other hand, a content item is classified as non-default if it is likely to not be part of the visual impact of the web page. A content item may also be classified as non-default if it is optional, for example, users viewing a web page may not expect to see slides after the first slide of a slideshow. A non-default content item may include, but is not limited to a slide of a slideshow and a tab. Again, the programmer or an editorial group may manually classify a content item of a web page as non-default and write the classification into the code of the web page.

Whether a content item is classified as default or non-default may also depend on how quickly it is expected to load or based on size. For example, whether a content item is small in size or large in size may depend upon a threshold, the capacity of the network, network traffic, or loading estimates, among others. As such, in some embodiments, the server computer may automatically classify content items as default or non-default content items based on any of these criteria (i.e., threshold, etc.). For example, the server computer may determine that a content item can be loaded quickly due to a small size, and therefore the server computer may automatically classify it as a default content item.

Even when the web page is divided into fragments, the number of requests that the client computer makes to the server computer to obtain substantially all of the fragments (e.g., all of the fragments) may be reduced to two requests. As used herein, a fragment may be practically any portion of a web page that can be separated out or isolated, such as a single slide of a slideshow, a single image, among others. Typically the programmer writing the code for the web page will designate the fragments in the code for the web page. The web page and its fragments may be written in HTML or a subset of XML called XHTML. A fragment is made up of at least one element, an element includes content (e.g., text or a file name associated with a slide, among others) to be displayed and markup (e.g., tags that begin with the character "<" and end with a ">" or an identifier, among others) that generally instruct how to display the content. A fragment of a web page may be displayed in a corresponding container of the web page.

The following is an example of a fragment representing an illustrative "slideX" component with three elements.

```
<div id="slideX">
    <div>Container X</div>
    <p>paragraph text</p>
</div>
```

In this example, the fragment includes (a) an outer div element indicating a separation or division in the web page as well as an identifier (i.e., slideX), (b) an inner div element also indicating a separation or division in the web page as well as the name of the container (i.e., Container X), and (c) a paragraph element indicating the paragraph text to be displayed. Container X is also written in terms of elements and located in a tree structure of a browser for loading the web page. The three elements of this example fragment, or just the inner div and paragraph elements of the fragment in this example, may be added to the elements of the Container X in the tree structure to fill in Container X with the fragment. The fragment is displayed in Container X. A fragment may be either a default content item or a non-default content item.

FIG. 1 shows an example client-server environment 100, including both software and hardware, that is suitable for implementing one or more of the embodiments described herein. The environment 100 includes at least one apparatus, such as at least one server computer 205 that interfaces with a plurality of client computers 105. Illustratively, the server computer 205 is a web server that responds to requests from the client computer 105 while the client computer 105 is a web client that makes requests to the server computer 205. Each computer 105, 205 represents practically any type of computer, any type of combination of computers (e.g., one or more networked computers in a cluster or other distributed computing system), or any type of programmable electronic device that is capable of functioning as a client and/or server.

Each computer 105, 205 includes at least one processor 110, 210, at least one bus 115, 215 and at least one memory 120, 220. Each processor 110, 210 is hardware based and represents the central processing unit (CPU) of the computer 105, 205. Furthermore, each processor 110, 210 may be a microprocessor that includes the majority or all of the functions of the CPU on a single integrated circuit or chip. Alternatively, each processor 110, 210 may represent a plurality of processors that operate in parallel such that the plurality of the processors are within the computer 105, 205 or a portion of the plurality of the processors is located on another coupled computer.

Each bus 115, 215 represents at least one of several types of bus structures, including a processor bus or local bus, a memory bus, an accelerated graphics port and a peripheral bus, among others, to couple the various components together in each of the computer 105, 205.

Each memory 120, 220 represents the random access memory (RAM) of computer 105, 205 and typically stores executable code. The executable code represents at least one instruction that is executed by the processor 110, 210, as well as any associated data (e.g., temporary variables or other intermediate data during the execution of the instructions), to implement the embodiments. As illustrated, at least a portion of the executable code of the client computer is organized into a Requesting Module 125, which further includes a Tracing Module 284 and a Parsing Module 285. The Parsing Module 285 tracks three states as outlined in the table of state data 286, such as table of state data 590 (FIG. 6), to parse and generate a data structure 287. At least a portion of executable code of the server computer is organized into a Responding Module 225. Modules are discussed further in connection with FIGS. 2A and 2B.

The memory 120 also includes the instructions and data utilized for client computer 105 to function as a web client 130 (e.g., a web browser). Likewise, memory 220 includes the data and instructions utilized for server computer 205 to function as a web server 230. Furthermore, each memory 120, 220 includes an operating system 135, 235 that controls the operation of computer 105, 205. The memory 120 also includes a web page 280 and a cache such as fragment cache 281. Content items may be stored in the fragment cache 281 in the form of a text string, thus, any structure that accommodates this form may be utilized. The memory 120, web page 280 and fragment cache 281 are discussed further in connection with FIG. 2B.

Each memory 120, 220 may also represent (a) any supplemental level of memory (e.g., a cache memory, a non-volatile memory, a backup memory, programmable memory, flash memory, read-only memory, among others), (b) memory storage physically located elsewhere in computer 105, 205 such as in a cache memory in processor 110, 210, (c) any storage capacity such as a virtual memory stored on a storage device 140, 240, and/or (d) on another coupled computer. For instance, executable code such as module 125, 225 may reside in the storage device 140, 240 prior to being loaded into memory 120, 220.

The storage device 140, 240 also includes at least one database 145, 245 for storing data, for example, in tables, indexes, etc. Furthermore, data may be stored in database 145, 245 from the implementation of the embodiments. Each storage device 140, 240 may include a hard disk drive for reading from and writing to a hard disk, a magnetic disk drive for reading from and writing to a removable magnetic disk and an optical disk drive for reading from or writing to a removable optical disk such as a CD or other optical media. The storage device, whether a hard disk drive, a magnetic disk drive, an optical disk drive, or a combination thereof, is connected to the bus 115, 215 by an appropriate interface. The drives and their associated computer readable media provide nonvolatile storage of computer readable instructions, data structures, program modules and other data for the computer 105, 205. Alternatively, the storage device 140, 240 may be magnetic cassettes, flash memory cards, digital video disks, etc.

Furthermore, each computer 105, 205 includes a basic input/output system (BIOS) that contains the basic routines that help to transfer information within the computer 105, 205, such as during start-up, stored in ROM 150, 250.

It is worth noting that executable code, executable by the processor 110, 210, typically resides on computer readable media. Computer readable media may take many forms, including but not limited to, storage media and transmission media. Examples of storage media include, but are not limited to, RAM, ROM, EEPROM, flash memory, optical disks (e.g., CD-ROM and digital versatile disks (DVD), etc.), magnetic cassettes, magnetic tape, hard disk drives, magnetic disk storage, or any other magnetic medium, floppy disks, flexible disks, memory chip, cartridge, volatile and non-volatile memory devices and other removable disks or any other medium which can be used to store the information and which can be accessed by computer 105, 205. Computer readable storage media do not include propagated data signals. Memory 120, 220, storage device 140, 240 and ROM 150, 250 are examples of storage type computer readable media.

Examples of transmission media include, but are not limited to, wired media such as coaxial cable(s), copper wire and optical fiber, and wireless media such as optic signals, acoustic signals, RF signals and infrared signals, and digital and analog communication links.

Each computer 105, 205 includes a user interface 155, 255 for interfacing with at least one input/output device 160, 260. Example output devices include a display device 165, 265 such as a monitor, a speaker, and a printer. A user can enter commands and data into each computer 105, 205 through input device 170, 270 such as a keyboard, a pointing device, a microphone, joystick, game pad, and scanner.

Each computer 105, 205 also includes a network interface 175, 275 that permits two-way communication of information with other computers and electronic devices through network 200 such as the Internet. Network interface 175, 275 may be an integrated services digital network (ISDN) card, modem, LAN card and any device capable of sending and receiving electrical, electromagnetic, optical, acoustic, RF or infrared signals. Network 200 may be public, private, wired, wireless, local, wide-area, or some combination thereof. Network 200 may be multiple, interconnected networks, among others. In client-server environment 100, client computer 105, one or more content providers 201 and server computer 205 are networked via network 200.

In an example embodiment, processor 110, 210 of computer 105, 205 is programmed by executable code such as module 125, 225 and modules thereof, which are stored at different times in the various computer storage media of computer 105, 205 or at least partially stored on remote computer storage media on a coupled computer. Module 125, 225 may be implemented as part of the operating system 135, 235 or an application, component, program, object, sequence of instructions, a data structure, a subset thereof, among other arrangements. At execution, module 125, 225 is loaded, at least partially, into the computer's primary memory (i.e., memory 120, 220) from the computer's secondary memory, (i.e., storage device 140, 240) where it is stored, and when read and executed by processor 110, 210 in computer 105, 205, module 125, 225 causes that respective computer to perform the program flow described herein. It is noted that at least a portion of module 125, 225 may execute on one or more processors in another computer coupled to computer 105, 205 via network 200, with processing allocated to multiple computers over a network.

Figure 2A:
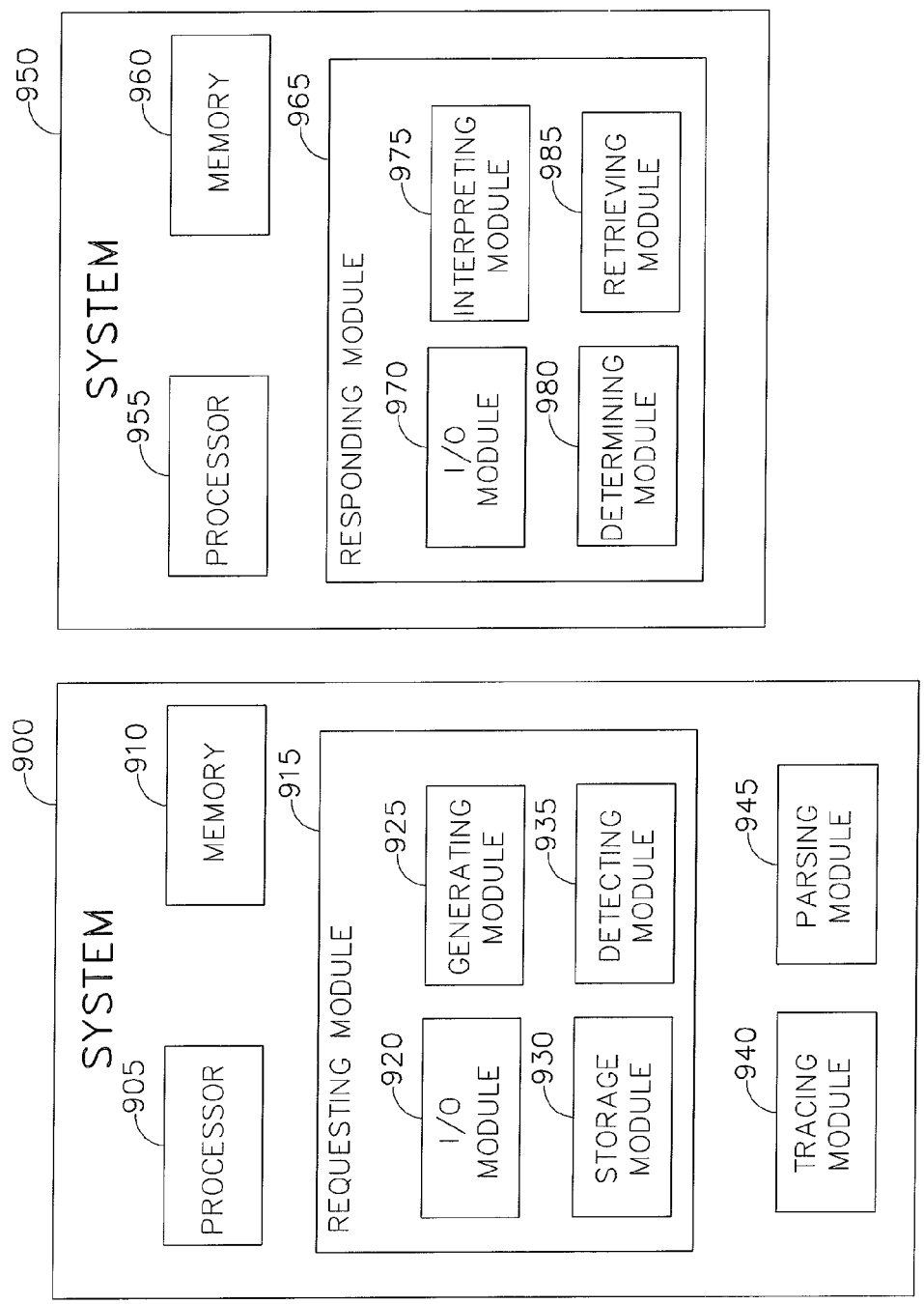
FIG. 2A is a block diagram of examples of systems according to one or more embodiments.
Figure 2B:
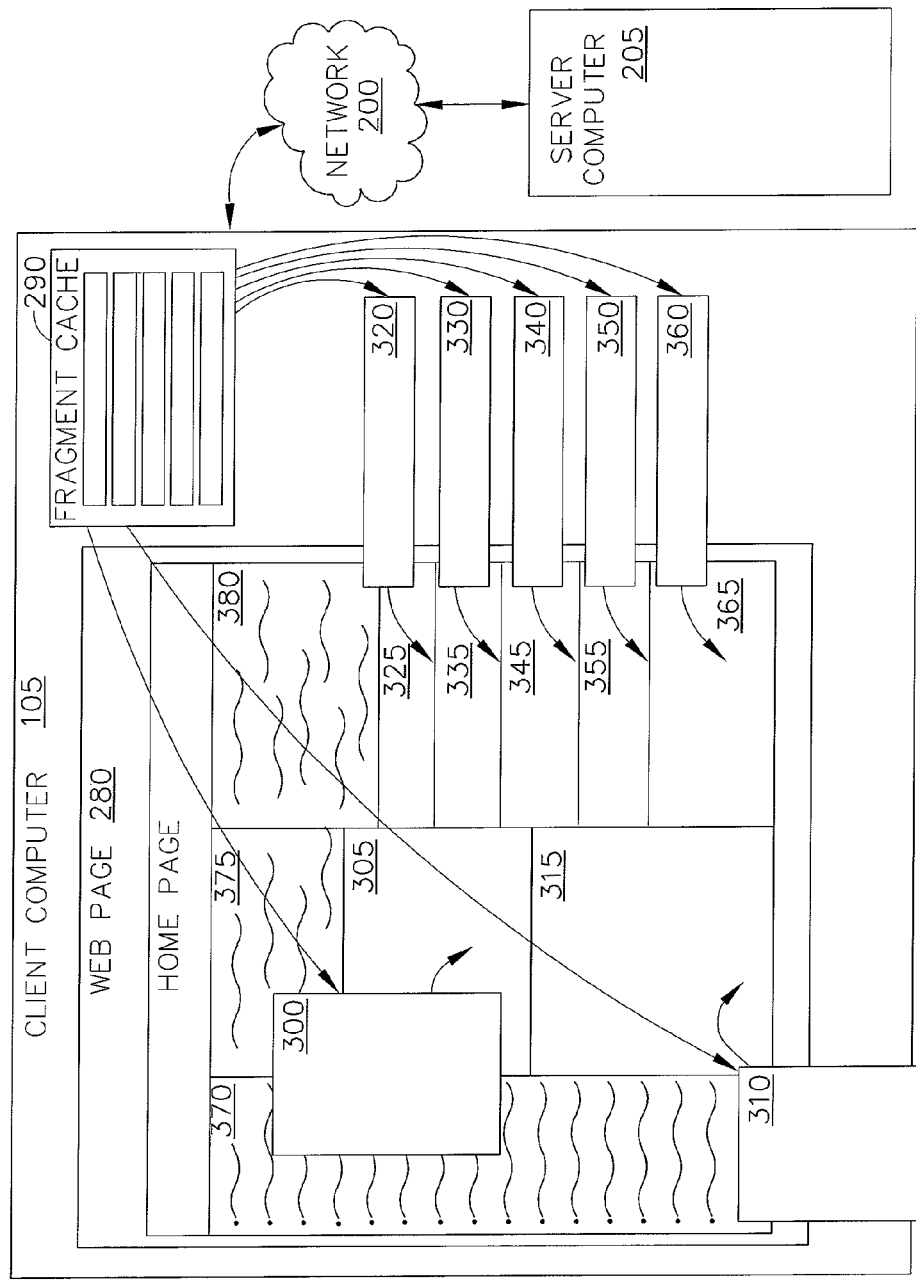
FIG. 2B is a block diagram of an example of a web page and fragment cache.

Furthermore, as illustrated in FIGS. 1 and 2B, module 125, 225 and modules included within module 125, 225, cause default content items to be received at the client computer 105 from the server computer 205 in response to the first single request, and displayed through containers 370, 375 and 380. Fragments 300, 310, 320, 330, 340, 350 and 360 are non-default content items received by the client computer 105 from the server computer 205 in response to the second request. Fragment 300 is displayed through container 305, fragment 310 is displayed through container 315, and fragments 320, 330, 340, 350 and 360 are displayed through containers 325, 335, 345, 355 and 365.

Indeed, based upon a demand for the web page 280, the Requesting Module 125 of the client computer 105 generates a first single request for the web page. The Responding Module 225 of the server computer 205 receives the first single request and responds with default content items, which are loaded into their appropriate containers, and illustrated in containers 370, 375 and 380 of the web page 280.

If there is a demand for any of the fragments that are non-default content items, such as for fragment 340 to be displayed in container 345, the Requesting Module 125 of the client computer 105 generates a second request and receives from the server computer 205 the non-default content items. In particular, the server computer 205 responds with fragments 300, 310, 320, 330, 340, 350 and 360 and these are stored in the fragment cache 290 as a text string. The Tracing Module 284 is called on demand to determine an identifier (e.g., "id=") for a demanded fragment, and at least one child index if applicable. In the following example the demanded fragment is fragment 340.

The Parsing Module 285 parses the text of the elements of the demanded fragment 340 in the fragment cache 290 using three states. The Parsing Module 285 also creates a data structure 287, such as a tree, to store the identifier and the parsed text of the elements of the demanded fragment 340 (e.g., both content and markup), among other data. The data structure may also include a tag name such as div or p. The parsed text of the elements of fragment 340 is loaded into container 345, and fragment 340 is displayed in container 345 in the web page 280 in the client computer 105. The Parsing Module 285 finds the fragment corresponding with the container.

When another fragment that is a non-default content item is demanded, for example, fragment 350 to be displayed in container 355, the Tracing Module 284 is called on to determine the identifier for fragment 350. The Parsing Module 285 uses the identifier to retrieve the parsed text of the elements of fragment 350 from the data structure 287, if the identifier is in the data structure 287, and the parsed text of the elements of fragment 350 is loaded and displayed. If the identifier is not in the data structure 287, then the process outlined in the above example for fragment 340 is followed.

It is noted that the number of requests by the client computer 105 to the server computer 205 to obtain all of the default and non-default content items of the web page 280 may be reduced to two requests. Furthermore, the Parsing Module 285 tracks fewer states, generates a data structure 287 that is light weight (e.g., small in size) and reusable, and is non-recursive, all of which may improve loading and performance.

FIG. 2A shows an example of a system 900 (such as client computer 105 of FIG. 1), including a processor 905 (such processor 110 of FIG. 1), memory 910 (such as memory 120 of FIG. 1), and various modules. System 900 includes a Requesting Module 915 (such as Requesting Module 125 of FIG. 1) that is configured to request a content item from a server computer. The Requesting Module 915 includes an I/O Module 920 configured to receive data transmissions from a server computer 205. I/O Module 920 may also be configured to send data transmissions to the server computer 205. System 900 also includes a Generating Module 925 to generate a request for a content item, a Storage Module 930 to store received content items, and a Detecting Module 935 to detect a demand for a content item. System 900 further includes a Tracing Module 940 to determine an identifier, and a Parsing Module 945 to parse data.

FIG. 2A also shows an example of a system 950 (such as server computer 205 of FIG. 1), including a processor 955 (such processor 210 of FIG. 1), memory 960 (such as memory 220 of FIG. 1), and various modules. System 950 includes a Responding Module 965 (such as Requesting Module 225 of FIG. 1) that is configured to respond with a plurality of content items. The Responding Module 965 includes an I/O Module 970 configured to receive data transmissions from a client computer. I/O Module 970 may also be configured to send data transmissions to the client computer. System 900 also includes an Interpreting Module 975 to read a request for a content item, a Determining Module 980 to determine which content items are classified as default and which content items are classified as non-default, and a Retrieving Module 985 to retrieve content items. Further functionality associated with one or more of the elements of system 900 and system 950 recited above will be discussed in relation to the diagrams of FIGS. 3-8.

Figure 3:
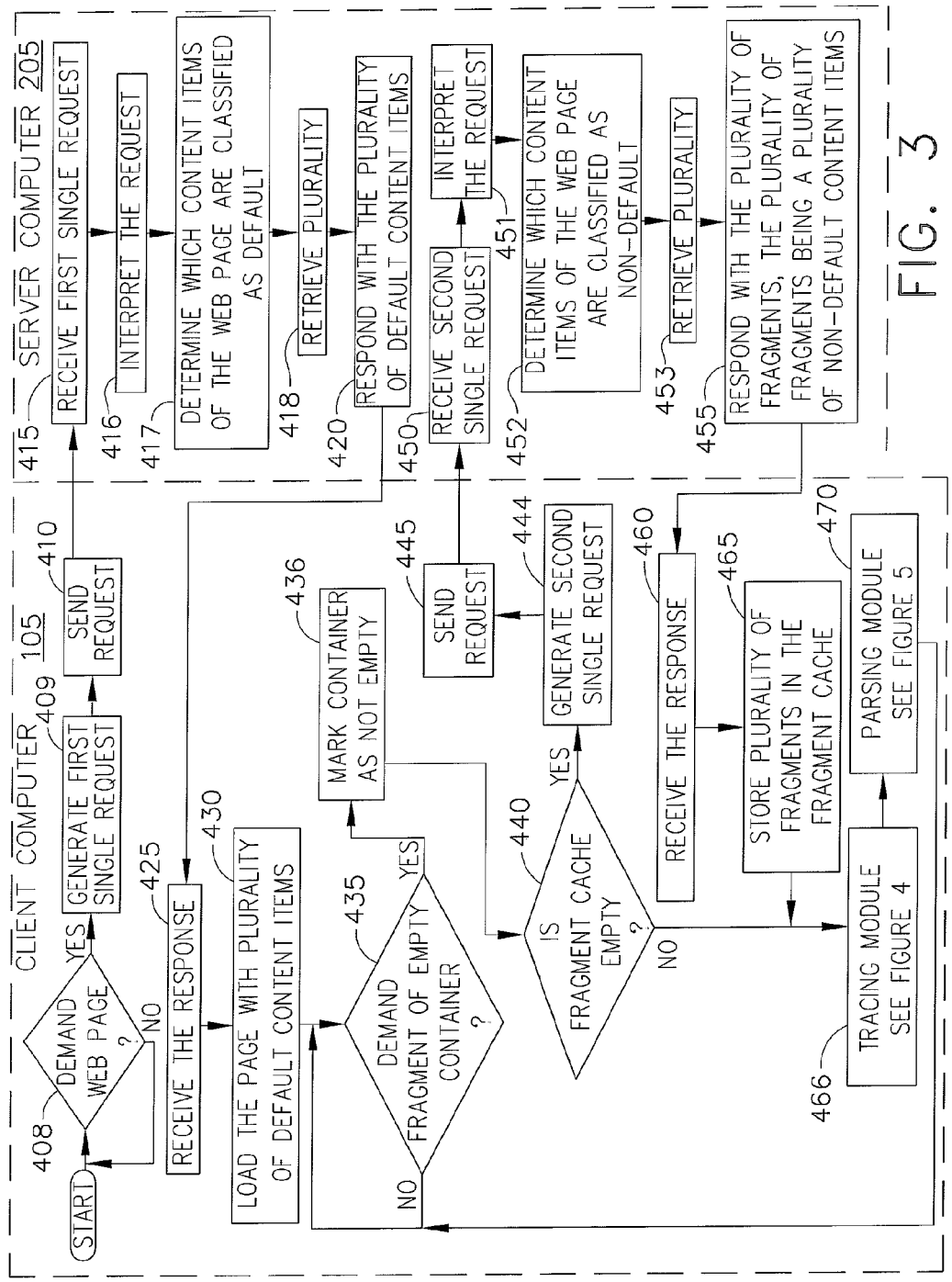
FIG. 3 is a flowchart illustrating program flow of an example embodiment of requesting and responding.

Turning to FIG. 3, and with further reference to FIGS. 1, 2A and 2B, FIG. 3 illustrates one embodiment of requesting and responding. For ease of understanding, the blocks associated with requesting and responding are illustrated side by side and reference each other. However, the embodiment may be rewritten to not reference each other.

In the client computer 105, at block 408, the Detecting Module 935 detects a demand for a content item, in this case, detects a demand for the entire web page 280. For example, the web page may be demanded when a user enters the uniform resource locator ("URL") of the web page 280 into a browser such as entering "www.msn.com" for the respective home page, or demanded when the user clicks on a link for the web page 280. The web page may also be demanded without a user's involvement in some embodiments.

Based on the demand for the web page, a web page cache may be checked to determine if the web page 280 is cached. Assuming the web page 280 is not cached, at block 409, the Generating Module 925 generates a first single request for at least one content item such as the entire web page 280. The first single request may be, but is not limited to an XML request, a modified XML, an HTTP request and a modified HTTP request. An example of the first single request is as follows: http://www.msn.com/. It is noted that the first single request may not include a query string when the entire web page is demanded. The first single request may indicate a request for at least one default content item to the server computer 205 through the query string or through the lack of a query string. Next, at block 410, the I/O Module 920 sends the first single request to the server computer 205 via the network 200 for the web page 280.

In the server computer 205, at block 415, I/O Module 970 receives the first single request. At block 416, the Interpreting Module 975 reads the first single request as a request for a plurality of default content items. For example, the Interpreting Module 975 may be configured to interpret the lack of a query string in the first single request as a request for a plurality of default content items of the web page 280. Other ways the Interpreting Module 975 may interpret the first single request as a request for a plurality of content items may be utilized in some embodiments. For example, the first single request may directly request at least one default content item, or the request may be identified as the first and the identification as the first is read as a request for a plurality of default content items by the Interpreting Module 975.

Next, at block 417, the Determining Module 980 determines which content items of the web page 280 are classified as default (i.e., default content items). As explained above, a content item may be classified as default or non-default either manually with the classification hard-coded in or in an automated manner. Moreover, the classification may be performed manually by the programmer when the code was initially written, and through manual revisions. In some embodiments, the receipt of the first single request for the web page 280 may trigger an automated classification by the server computer 205, or the server computer 205 may classify in an automated manner before receipt of the first single request.

It is noted that the classification may change based on a variety of factors such as, for example, but not limited to, periodic or ad hoc decisions by the programmer or editorial board to change a classification, changes in network traffic, changes in estimated loading times and changes in a size threshold. Indeed, the classification of a content item may change many times throughout the day. Thus, the Determining Module 980 may be called each time the server computer 205 receives a request, or may be called at predetermined time intervals in some embodiments.

At block 418, the Retrieving Module 985 retrieves the plurality of default content items. The Retrieving Module 985 may obtain the default content items from a computer readable storage media. The default content items may be obtained from a computer readable storage media by reading in at least one field from the memory 960, or cache thereof, or the database 245 (FIG. 1). At block 420, the I/O Module 970 generates a response with the plurality of default content items for the web page 280 and sends the response to the client computer 105. The I/O Module 970 responds with substantially all default content items, such as all of the default content items. However, in some embodiments, the response includes less than all of the default content items.

The I/O Module 970 sends elements of the default content items. As an example, either option A or option B may be sent for the following fragment that is a non-default content item:

Option A:

```
<div id="slideX">
    <div>Container X</div>
    <p>paragraph text</p>
</div>
``` or

Option B:

```
<div>Container X</div>
<p>paragraph text</p>
```

It is noted that either all of the elements may be sent in the response, or less than all of the elements may be sent, for a default content item depending on the embodiment. For example, Option A includes the outer div element with the identifier while Option B does not include the outer div element.

In the client computer 105, at block 425, the I/O Module 920 receives the response with the plurality of default content items for the web page 280 to the first single request. At block 430, I/O Module 920 loads the plurality of default content items into their respective containers in the browser's tree structure, and default content items are displayed in the containers. For instance, the convention referred to as the document object model (DOM) may be utilized for loading and displaying. It is worth noting that in the case that Option A is sent for a non-default content item, the outer div element of Container X in the browser's tree structure may be replaced with the outer div element of Option A, but not in the case of Option B.

Next, at block 435, the Detecting Module 935 determines whether or not there is a demand for a second content item, for example, a demand by a user for a fragment of an empty container (i.e., container does not have elements of the fragment and therefore the element cannot be displayed). The demand may be initiated by one of the following, for example, but not limited to, a user selecting a slide of slideshow, a user selecting a different tab, other user action, a timer such as a timer associated with a slideshow, and a cookie. The Detecting Module 935 determines if the container of the demanded fragment in the browser's tree structure is empty using executable code on the client computer 105 that determines if there are any elements of the type div for the container. In general, the code is written to ask whether the container has any children. If the Detecting Module 935 determines that the container has children, then the container is not empty and the user selected a default content item that is already displayed. Thus, the Detecting Module 935 may continue to monitor for a demand. However, if the Detecting Module 935 determines that the container does not have any children, then the container is empty.

On the event that the container is empty, at block 436, Requesting Module 915, or another module thereof, marks the container as not empty (e.g., in the tree structure of the browser) as the subsequent blocks will fill in the container and it will become not empty. At block 440, Requesting Module 915 determines if the fragment cache 281 is empty, for example, also by checking if the fragment cache has any elements of the type div or children.

If the fragment cache is empty, the Generating Module 925 generates a second single request at block 444. In particular, the Generating Module 925 may keep track of which fragment was demanded and interpret the demanded fragment to be a non-default content item, as all of the default content items were previously received at block 425 and loaded at block 430. As such, the Generating Module 925 may generate a second single request with a query string asking for at least one content item such as asking for at least one non-default content item. In some embodiments, the second single request may directly ask for substantially all non-default content items, such as all non-default content items. The second single request may be, but is not limited to an XML request, a modified XML, an HTTP request and a modified HTTP request. An example of the second single request is as follows: http://www.msn.com/?PM=z:1. The query string is PM=z:1. The second single request may indicate a request for at least one non-default content item to the server computer 205 through the query string. Next, at block 445, the I/O Module 920 sends the second single request to the server computer 205 via the network 200 for the web page 280.

In the server computer 205, at block 450, I/O Module 970 receives the second single request. At block 451, the Interpreting Module 975 reads the second single request as a request for a plurality of non-default content items. For example, the Interpreting Module 975 may be configured to interpret the query string in the second single request as a request for a plurality of non-default content items of the web page 280. Other ways the Interpreting Module 975 interprets the second single request as a request for a plurality of content items may be utilized in some embodiments. For example, the request may be identified as the second and the identification as the second is interpreted as a request for a plurality of non-default content items by the Interpreting Module 975.

Next, at block 452, the Determining Module 980 determines which content items of the web page 280 are classified as non-default (i.e., non-default content items). As explained above, a content item may be classified either manually with the classification hard-coded in or in an automated manner. The classification may be performed manually by the programmer when the code was initially written and through manually revisions. Furthermore, the classification may change based on a variety of factors such as, for example, but not limited to, periodic or ad hoc decisions by the programmer or editorial board to change a classification, changes in network traffic, changes in estimated loading times and changes in a size threshold.

At block 453, the Retrieving Module 985 retrieves the plurality of non-default content items. The Retrieving Module 985 may obtain the non-default content items from a computer readable storage media. The non-default content items may be obtained from a computer readable storage media by reading in at least one field from the memory 960, or cache thereof, or the database 245 (FIG. 1). At block 455, the I/O Module 970 generates a response with the plurality of non-default content items for the web page 280. In particular, the response includes a plurality of fragments, with the plurality of fragments being a plurality of non-default content items. The plurality of fragments includes the demanded fragment of block 435. The I/O Module 970 responds with substantially all default content items, such as all default content items. However, in some embodiments, the response includes less than all of the default content items.

For instance, turning to FIG. 2B, assuming that a user demanded fragment 330, the second single request from the client computer 105 may ask for at least one non-default content item and the response from the server computer 205 may include a plurality of fragments that are non-default content items, such as fragments 320, 330, 340, 350, 360, 300 and 310. In some embodiments, less than all of the fragments may be included.

Next, at block 460, the I/O Module 920 receives the response with the plurality to the second single request. At block 465, the Storage Module 930 stores the plurality of fragments in the fragment cache 281 as a text string. For example, the text string may be a single text string with all of the elements of the non-default content items that were received. At block 466, control passes to the Tracing Module 940 in FIG. 4.

Figure 4:
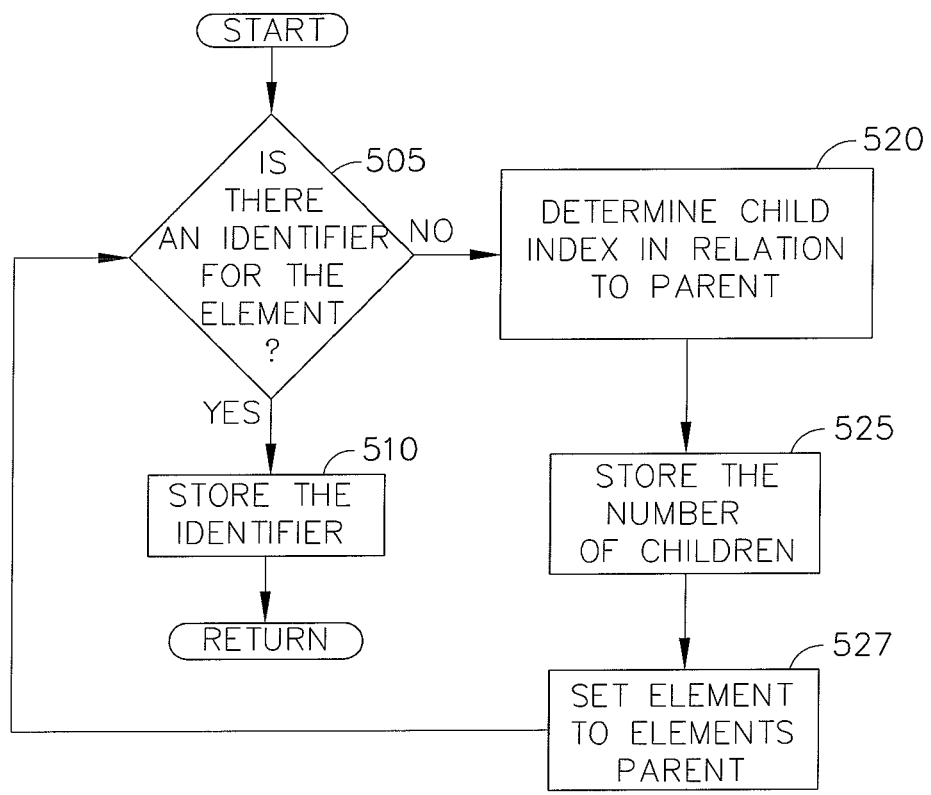
FIG. 4 is a flowchart illustrating program flow for an example embodiment of tracing.

Turning to FIG. 4, the Tracing Module 940 determines an identifier for the demanded fragment. The Tracing Module 940 is called on demand to determine an identifier, and in some embodiments, may initially set the starting element for the trace by searching the text string of the fragment cache 281 for one or more elements of the demanded fragment. For example, the search may include looking for an element referencing the container associated with the demanded fragment, as this may indicate that the element is associated with the demanded fragment. In some embodiments, a search may not be performed. In some embodiments, at least one temporary variable may be set to the element. A path approach may be taken in some embodiments or an application of the path to an element approach may be taken in some embodiments.

Nonetheless, at block 505, the Tracing Module 940 determines whether there is an identifier for the element, for example, by looking for an "id" such as <div id="slide1">. If an identifier is found, then at block 510, the Tracing Module 940 stores the identifier for use by the Parsing Module 945 described later for FIG. 5. However, if the identifier is not found, at block 520, the Tracing Module 940 determines the child index in relation to the parent.

At block 520, the Tracing Module 940 determines the child index of the current element in relation to the parent. In particular, the text string of the fragment cache 290 may be implemented as an array, and the array may be utilized to keep track of the plurality of fragments in the text string. For example, the array may include a number of positions, each position has data for a fragment from the plurality of fragments (e.g., data for a fragment may be at least one element of the fragment), and each position has an index (e.g., indices (i.) zero through the number of positions minus one or (ii.) one through the number of positions depending on whether the starting value is zero or one). Moreover, the array maintains parent and child relationships, thus, the position of a child in the array is represented by its child index and/or can be computed from its child index, At block 525, the Tracing Module 940 stores the child index, and at block 527, the Tracing Module 940 sets the current element to the element's parent. Next, the Tracing Module returns to block 505, where either the identifier for the element is found and then stored at block 510, or the process is repeated by returning to block 520. This loop may be repeated until a parent with an identifier is found, and the, the number of child indexes may depend on the number of children in the array. Via this algorithm, the identifier of the nearest parent may be determined, as well as at least one child index, and specific elements of the demanded fragment (and elements of other fragments) can be found again by the Parsing Module 945 by reversing the algorithm (e.g., find element with the determined identifier, get $n^{th}$ child, get $n^{th}$ child, etc.).

Figure 5:
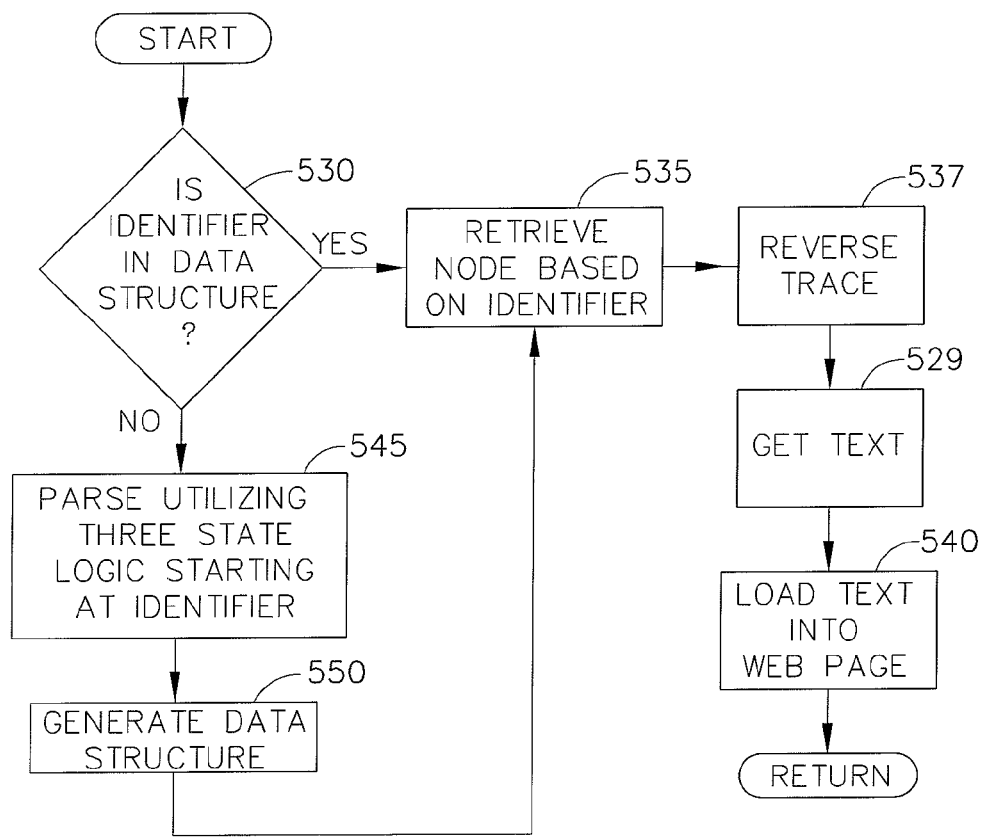
FIG. 5 is a flowchart illustrating program flow for an example embodiment of parsing.
Figure 8:
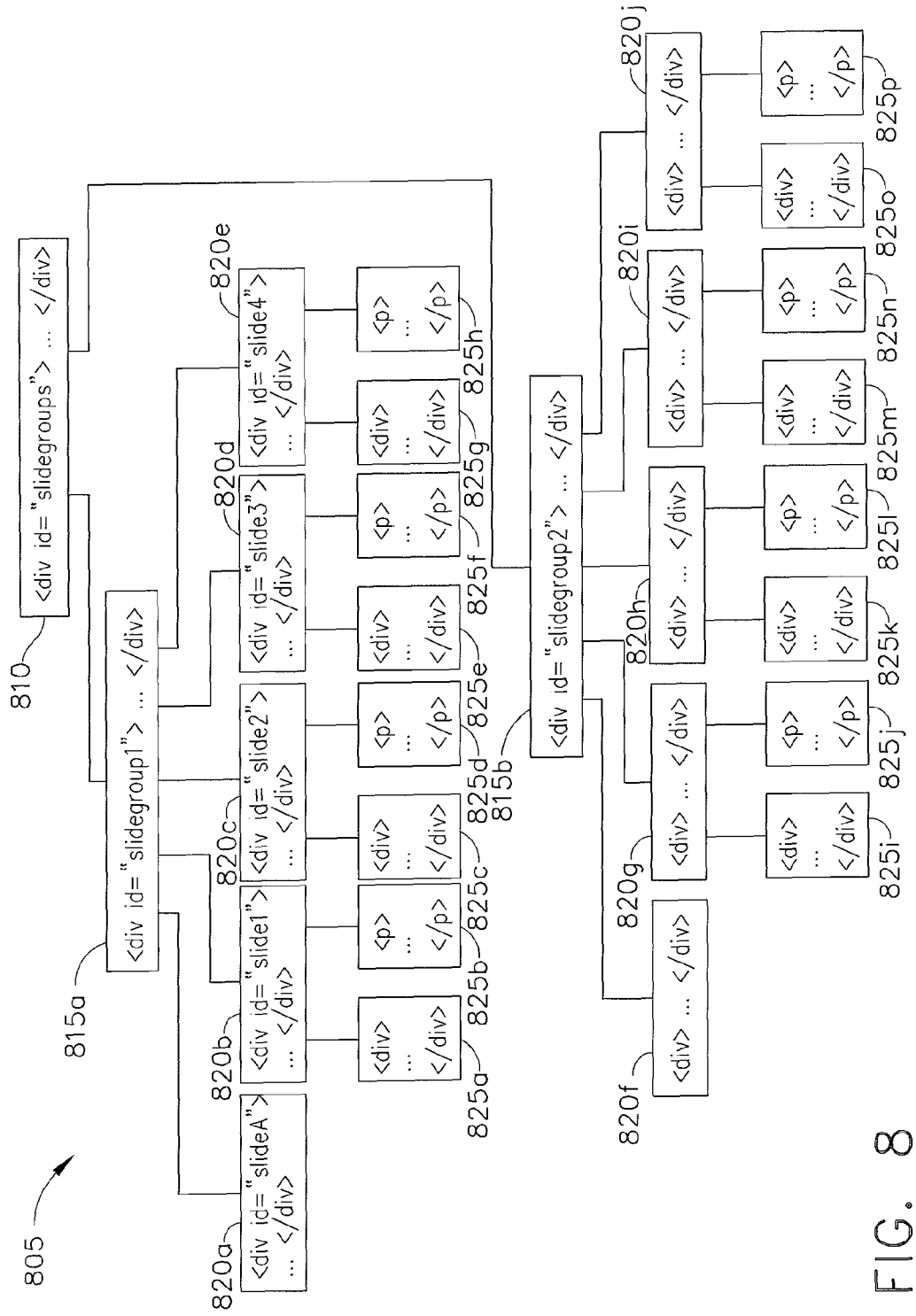
FIG. 8 is a diagram of an example of a data structure.

Next, control returns to FIG. 3 and passes from block 466 to block 470, which is the Parsing Module 945 of FIG. 5. At block 530 of FIG. 5, the Parsing Module 945 determines if the identifier determined for the demanded fragment is in a data structure, such as data structure 287 (FIG. 1). The data structure may be a tree as shown in FIG. 8. If this is the first iteration, the data structure may not yet exist at block 530, or may exist but may be empty.

If the identifier is not found in the data structure, at block 545, the Parsing Module 945 parses the text of the elements in the fragment cache 281 of the demanded fragment. The Parsing Module 945 starts parsing at the identifier. The Parsing Module 945 may make a first pass over the text to find comments in the code. Areas with comments are tracked so that the Parsing Module 945 can ignore them in a subsequent pass. Alternatively, the Parsing Module 945 may remove the text with comments.

Furthermore, the Parsing Module 945 uses three states. It is noted that instead of tracking many states and building a large state table, the Parsing Module 945 parses the text of the elements of the demanded fragment from the cache by tracking a first IsLT state for detecting a "less than" character, a second IsStartTag state for detecting a start tag, and a third MaybeAttr state for detecting an attribute, as outlined in the table of state data 590 in FIG. 6. In particular, scanning techniques, such as searching for character matches, may be utilized so that some of the characters are effectively ignored and states where no actions are required may be skipped. Thus, substantially all of the characters (e.g., all of the characters) may be read, but the Parsing Module 945 may still result in improvements in memory usage, maintenance and ease of understanding. The Parsing Module 945 is able to track these three states when the elements are written in XML, XHTML, or other language with strict rules regarding proper syntax and/or proper element nesting such as strict rules requiring both a start tag and an end tag for each element.

It is also noted that the Parsing Module 945 parses without utilizing a stack, which may further improve performance. A stack is a structure where data is added, referred to as pushing, and removed, referred to as popping, and where the last data in is the first data out. Instead of generating both a stack and data structure 287, at block 550, the Parsing Module 945 simply tracks depth while generating the data structure 287.

In particular examples, the data structure is a tree structure with a plurality of nodes (an example of which is shown in FIG. 8). The nodes correspond with text of elements from the fragment cache 281. Moreover, each tag corresponds with a node in the data structure 287. The data structure 287 may include the following, for example, per node: the identifier (e.g., determined identifier of the demanded fragment), the parsed text (e.g., both content and markup) (e.g., parsed text of the elements of the demanded fragment), list of children, a start index indicating a start character of the parsed text, and an end index indicating an end character of the parsed text. It is noted that the data structure may have fewer than all of this data while parsing and generating the data structure 287. However, afterwards, both indexes are defined in the data structure as well as the list of children. The data structure 287 may have a one to one storage correspondence. Alternatively, the data structure may have additional values. The data structure may also include a tag name such as div or p. It is noted that the tag name may not be initially populated in the data structure 287 but may be found on demand. Each child node may have its own start index and end index. The data structure 287 may mirror or be similar to the tree structure of the browser.

Next, control passes to block 535, whether from block 550 or from block 530, and the Parsing Module 945 retrieves node based on the identifier from the data structure 287. It is noted that the parsed text may not be retrieved directly, instead, for example, if data structure 287 is a tree, the node of a subtree of data structure 287 corresponding to the determined identifier may be found. After that subtree is found, a reverse trace may be performed on that subtree to find the nodes corresponding to the demanded fragment's elements and the nodes with the elements provide the parsed text. Alternatively, a node of data structure 287 corresponding to the determined identifier may be found, with the node being a separate data structure also in the form of a tree. After that other data structure is found, at block 537 a reverse trace may be performed on that other data structure to find the nodes corresponding to the demanded fragment's elements and the nodes with the elements provide the parsed text. If data for other fragments is associated with the determined identifier, the Parsing Module 945 uses the child index or indexes determined from the Tracing Module 940 to retrieve the appropriate parsed text at block 539.

At block 540, the parsed text of the elements of demanded fragment is added to the elements of the empty container in the tree structure of the browser, and the demanded fragment is displayed in the container in the web page 280 in the client computer 105.

Next, control returns from the Parsing Module 945 at block 470 to block 435 to monitor for demand of a fragment of an empty container. If there is no demand, this may indicate that the user is satisfied with what is currently displayed on the web page 280. Thus, the Detecting Module 935 continues to monitor for a demand for a fragment of an empty container. In some embodiments, monitoring may occur at predetermined time intervals instead of continuously. In some embodiments, monitoring occurs by listening for events.

When another fragment that is a non-default content item is demanded, the fragment cache will not be empty at block 440, and control passes to the Tracing Module 940 and then to the Parsing Module 945. At block 520 in FIG. 4, if applicable, the Tracing Module 940 will determine at least one child index. In FIG. 5, at block 530, if the Parsing Module 945 determines that the identifier is already in the data structure, such as when multiple fragments have the same identifier because they traced to the same nearest parent, then at block 535, the Parsing Module 945 will retrieve the node based on the identifier from the data structure 287. After the other data structure is found, a reverse trace may be performed at block 537 and the Parsing Module 945 uses the child index or indexes determined from the Tracing Module 940 to retrieve the appropriate parsed text at block 539. The parsed text is then loaded into the empty container in the browser's tree structure for displaying the demanded fragment on the web page at block 540.

The Tracing Module 940 and the Parsing Module 945 may be called as many times as there are empty containers on the web page. Furthermore, it is noted that even though a plurality of fragments (that is a plurality of non-default content items) is included in the response to the second single request in stored in the fragment cache, fragments that are not demanded are not loaded for display. However, these fragments are available in the fragment cache 281 in the client computer 105 so that if there is a demand for any of these fragments, an additional request (e.g., a third request, fourth request, an $n^{th}$ request) to the server computer 205 may be avoided. Thus, substantially all of the default content items and substantially all non-default content items of a web page may be received at the client computer 105 with two requests from the client computer. Furthermore, the data structure such as the data structure 805 shown in FIG. 8 provides the Parsing Module 945 with the ability to jump to nodes sought and skip over nodes not sought based on the identifier.

It is noted that the server computer 205 may contain more up-to-date information than what is stored in the fragment cache 281. To have continuously updated content in a fragment, the fragment may include a specific trigger built into its code to request continuous content from the server computer 205. For example, for a stock ticker to receive continuous stream of information from the server computer 205, a trigger is included in the elements of the stock ticker fragment. In this example no new requests are required of the client computer 105 to the server computer 205 to update the stock ticker fragment. Thus, substantially all of the default content items and non-default content items of a web page may still be received at the client computer 105 with two requests.

Variations may be made to the embodiments discussed herein. For example, JQuery may be utilized but is not necessary. JQuery refers to a JavaScript Library for HTML document traversing, event handling, animating and Ajax interactions. Ajax is an abbreviation for Asynchronous JavaScript and XML and used on the client-side to create interactive web applications. The Tracing Module 940 and/or the Parsing Module 945 may determine the total number of children of a parent by calculating the length. The Parsing Module 945 may return an empty string to the browser's tree structure if the identifier or the number of children from the Tracing Module 940 is not found in the fragment cache 281. In some embodiments, an error message may be generated in this scenario, or if any failure is encountered in the embodiments discussed herein. The Tracing Module 940 may report an error message if it cannot determine the identifier and/or the number of children or both the identifier and the number of children. Alternatively, instead of an error message, in some embodiments the cache can be repopulated, for example, after the response to the first single request is received but this may cause the content items to be out of sync and a refresh or re-load of the web page may be recommended. Moreover, the Detecting Module 935 may determine whether the user has proceeded to a different web page. As the user proceeds to different web page, then the Requesting Module 915 and the Responding Module 965 may be called.

Also, although the discussion has assumed that web page 280 is divided into many fragments, this is not the only implementation. For example, the web page 280 may be divided into a first page with all default content items and a second page with all non-default content items. When the programmer writes the first page, the first page may be classified as default or content items of that first page may be classified as default. Similarly, when the programmer writes the second page, the second page may be classified as non-default or content items of that second page may be classified as non-default. As such, with reference to FIG. 3, the demand for the web page 280 at block 408 may trigger the generation of a first single request that is interpreted by the Interpreting Module 975 at block 416 as a request for a plurality of default content items. The response to this first single request may be the first page with all default content items. Similarly, demand for any non-default content item at block 435 may generate a second single request that is interpreted by the Interpreting Module 975 at block 451 as a request for a plurality of non-default content items. The response to this second single request may be the second page with all default content items. In some embodiments, the first page and second page may be divided into fragments, so the first page is a fragment page of default content items, and the second page is a fragment page of non-default content items.

Furthermore, the Parsing Module 945, with or without the Tracing Module 940, may be utilized independently of web page loading. For example, the parsing module may be utilized in a different context where text is parsed from a computer readable storage media.

Figure 7:
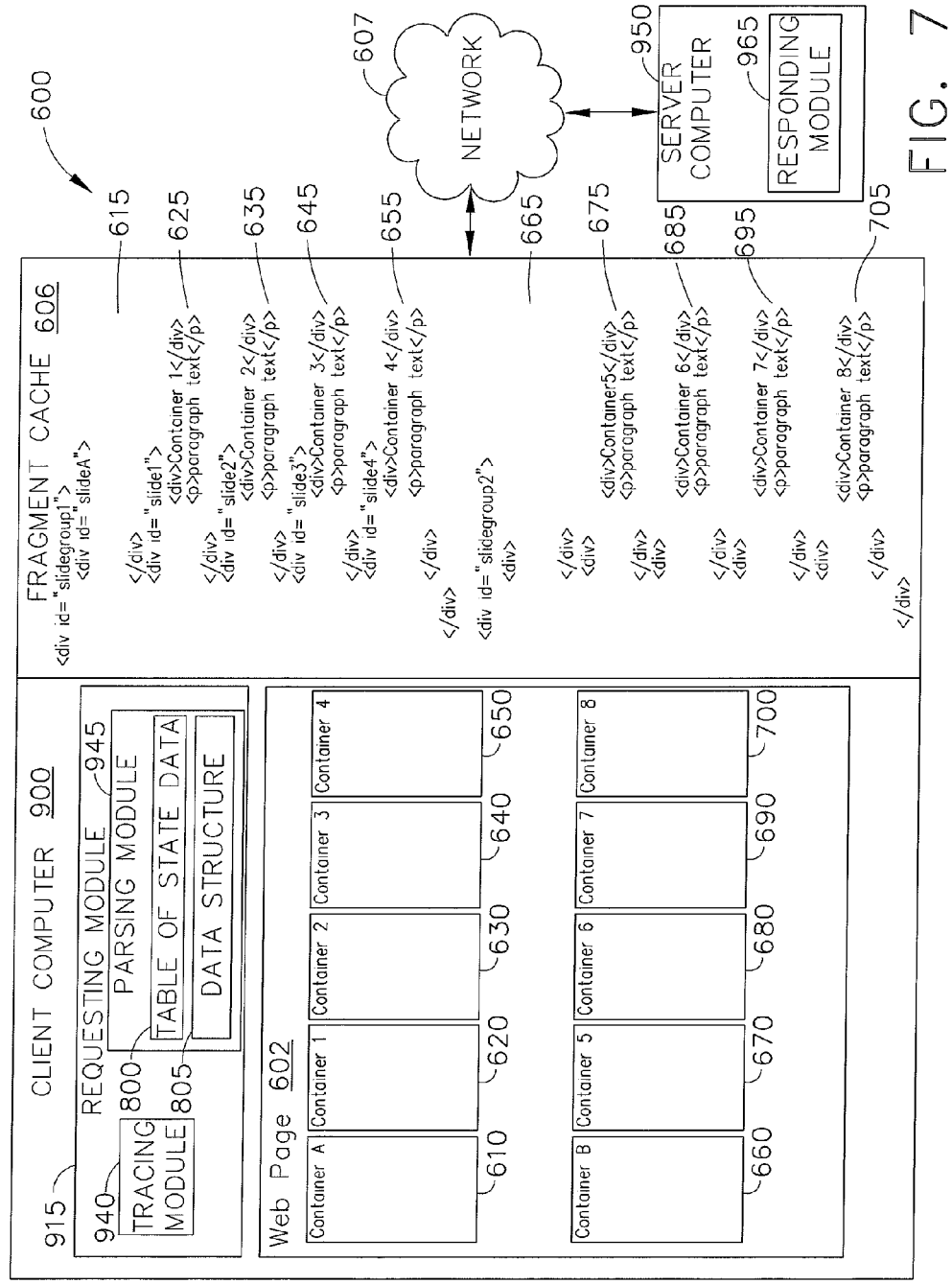
FIG. 7 is a block diagram of an example implementation.

Turning to FIG. 7, this figure illustrates an example implementation of the Requesting Module 915, the Tracing Module 940, the Parsing Module 945, and the Responding Module 965, and modules thereof illustrated in FIG. 2A, discussed herein. As illustrated, the web page 602 was coded to have ten containers, namely, Container A/610, Container 1/620, Container 2/630, Container 3/640 and Container 4/650, for one slideshow and Container B/660, Container 5/670, Container 6/680, Container 7/690 and Container 8/700 for a second slideshow. Each container corresponds with one fragment, and each fragment represents a single slide of its respective slideshow. The fragments of Container A/610 and Container B/660 of the web page 602 are classified as default in the code, while the fragments of Containers 1-8 are classified as a non-default in the code. The containers and the fragments are written in XML, XHTML, or other language that adheres to strict rules about syntax and element nesting.

In this example 600, a user at a client computer 900 (such as system 105 in FIG. 2B) opens a web browser and types a uniform resource locator (URL) or clicks on a link of a web page 602 (such as the web page 280 in FIGS. 1 and 2B) that he or she wants displayed. Based upon the demand for the web page 602, the Generating Module 925 of the Requesting Module 915 generates a first single request for the web page 602 via network 607 (such as the network 200 in FIGS. 1 and 2B) and the I/O Module 920 sends the first single request to server computer 950 (such as the server system 205 in FIG. 2B). The first single request is an http request without a query string.

The first single request is received at the server computer 950 by the I/O Module 970 of the Responding Module 965 and interpreted by the Interpreting Module 975 as a request for a plurality of default content items. The Determining Module 980 determines that fragments 615 and 665 are default content items, and these are: fragment 615:

```
<div id= "slideA ">
    <div>Container A</div>
    <p>paragraph text</p>
</div>
``` fragment 665:

```
<div id= "slideB ">
    <div>Container B</div>
    <p>paragraph text</p>
</div>
```

Alternatively, the fragments may only have the inner div and paragraph elements, and not the outer div elements. The Retrieving Module 985 retrieves those fragments, and the I/O Module 970 responds with those fragments.

The I/O Module 920 of the Requesting Module 915 receives fragment 615 of Container A/610 and fragment 665 of Container B/660, and the elements of these fragments are added to the elements of Container A/610 and Container B/660 in the web browser's tree structure for displaying the fragments in web page 602. If the fragments have the inner div and paragraph elements, then these can be added in between the outer div elements of the containers in the browser's tree structure. If the fragments have the outer div, inner div and paragraph elements, then the three elements are added to the browser's tree structure, replacing the outer div elements for Containers A/610 and B/660. Indeed, if the client computer 900 disconnects from the network 607, slideA represented by fragment 615 and slideB represented by fragment 665 are still available for display from the browser's tree structure. However, if the connection to the network 607 fails, the other slides of these slideshows are unavailable, as they were classified as non-default content items to be demanded by the user or other trigger.

Assuming the user demands to see the slide of Container 1/610, for instance, by clicking on Container 1 with his or her mouse, the Detecting Module 935 of the Requesting Module 915 detects the demand and determines if Container 1/620 is empty by determining if there are any children of the type div for Container 1/620 in the browser's tree structure. If Container 1/620 is empty, and the fragment cache 606 (such as the fragment cache 281 of FIG. 1) is also empty, the Generating Module 925 generates a second single request for a content item. For example, the query string of the second request may request at least one non-default such as the fragment of Container 1/620 or all fragments remaining as these are non-default content items. The I/O Module 920 sends the second single request to server computer 950.

The second single request is received at the server computer 950 by the I/O Module 970 of the Responding Module 965 and interpreted by the Interpreting Module 975 as a request for a plurality of non-default content items. The Determining Module 980 determines that fragments 625, 635, 645, 655, 675, 685, 695, and 705 are the non-default content items. The elements of these fragments are illustrated in FIG. 7. The Retrieving Module 985 retrieves those fragments, and the I/O Module 970 responds with those fragments.

In particular, the response includes a cacheable plurality of fragments that are non-default content items, including demanded fragment 625 for Container 1/620 plus the fragments for the other containers of the first slideshow, such as the fragments for Containers 2/630, 3/640 and 4/650, which are fragments 635, 645, and 655, respectively. The plurality of fragments in the response may also include the fragments for the Containers of the second slideshow as well, such as the fragments for Containers 5/670, 6/680, 7/690, and 8/700, which are fragments 675, 685, 695 and 705, respectively. As such, all of the fragments of the web page 602 are received by the system 900 with two requests.

The I/O Module 920 of the Requesting Module 915 receives the plurality of fragments 625, 635, 645, 655, 675, 685, 695, and 705 for Containers 2/630, 3/640, 4/650, 5/670, 6/680, 7/690, and 8/700, respectively, from server computer 950 in response to the second single request. The response is in the form of a single string of text of elements of the fragments, and stored in fragment cache 606 by the Storage Module 930 of the Requesting Module 915. The single string of text includes the data illustrated in the fragment cache 606. Each fragment includes an outer div element, an inner div element and a paragraph element in this example. The demanded fragment 625 is as follows:

```
<div id= "slide1">
    <div>Container 1</div>
    <p>paragraph text</p>
</div>
```

As explained herein, the fragment may include all elements or fewer than all elements. It is noted that the inner div and paragraph elements of fragment 615 for Container A/610 and fragment 665 for Container B are not sent because these were previously received as default content items with the first response.

To find the demanded fragment 625 in the fragment cache 606 that corresponds with Container 1, the Tracing Module 940 determines an identifier for the demanded fragment that corresponds with Container 1/620. In this example, the Tracing Module 940 searches the single string of text in the fragment cache 606 for an element, finds <div>Container 1</div> associated with Container 1, finds <div id="slide1">, and determines the identifier for the demanded fragment to be slide1. The Tracing Module 604 stores this identifier. No child index may need to be determined and stored as demanded fragment 625 directly has an identifier.

The Parsing Module 945 utilizes the identifier slide1 to obtain the elements of the fragment 625 from the fragment cache 606. The Parsing Module 945 utilizes the table of state data 800 (i.e., 590 of FIG. 6) to read characters starting at the element with the identifier. Three states (i.e., IsLT, IsStartTag, and MaybeAttr) are taken into account, even though all of the characters of the three elements of fragment 625 may be read. Specifically, the Parsing Module 945 takes into account these characters: <, d, i, v, space, i, d, =, ", s, l, i, d, e, 1, ", >, <, d, i, v, >, <, p, >, <, /, <, /. The Parsing Module 945 is able to track the three states and account for these characters, instead of tracking many more states and characters, due to the XHTML.

The Parsing Module 945 also creates a data structure, such as illustrated tree 805 in FIG. 8, that includes the identifier (e.g., illustrated as slide1 in node 820*b*), a start index indicating a starting character (e.g., <), an end index indicating an ending character (e.g., >), the list of children (e.g., 2 as it has a child div 825*a* and a child p 825*b*)), and the text of the elements including markup tags, such as everything in the outer div, inner div, and paragraph elements (e.g., illustrated in nodes 820*b*, 825*a*, and 825*b*). In some embodiments, the data structure generated for identifier slide1 may only include nodes 820*b*, 825*a* and 825*b*.

Next, the Parsing Module 945 retrieves node 820*b* of demanded fragment 625 based on the identifier slide1 corresponding with Container 1/620 from the data structure. The Parsing Module 945 adds the text of nodes 820*b*, 825*a*, and 825*b* into the elements of Container 1 in the browser's tree structure for displaying demanded fragment 625 in the web page 602. It is also noted that any images or other entities referenced (e.g., by file name) in the parsed text of the elements of demanded fragment 625 may have to be retrieved. If for some reason fragment 625 needs to be loaded again, the Parsing Module 945 may utilize the identifier slide1 to retrieve the data (e.g., nodes 820*b*, 825*a*, and 825*b*) from the data structure.

In this example, each fragment in the first slideshow has an identifier associated with it, and therefore, each of these fragments may be processed as discussed above in connection with fragment 625 for Container 1/620. The data structure generated for the other identifiers are illustrated in FIG. 8. Similarly, tabs may be processed as discussed above in connection with fragment 625 for Container 1/620.

However, assuming that the user demands fragment 675 of Container 5/670 in the second slideshow. To retrieve the correct fragment from the fragment cache 606 that corresponds with Container 5/670, the Requesting Module 915 calls the Tracing Module 940 to determine the identifier for the elements of demanded fragment 675. The Tracing Module 940 searches the single string of text in the fragment cache 606, encounters a fragment with the element <div>Container 5</div>, but no identifier is associated with the elements of this fragment 675. As such, the Tracing Module 940 traces to a nearest parent, determines and stores a child index (e.g., child index equal to one assuming the array starts with zero). As illustrated, no identifier is associated with the elements of fragment 665 either (e.g., child index equal to zero assuming the array starts with zero), which is above the elements of fragment 675, but above fragment 665, the outer div element has an identifier, namely, slidegroup2. Thus, the identifier for fragment 675 is slidegroup2. In addition, there are two children fragments in relation to the demanded fragment 675, and the Tracing Module 940 stores identifier slidegroup2 and the child indexes.

The Parsing Module 945 utilizes identifier slidegroup2 to obtain the elements of the fragment 675 from the fragment cache 606. The Parsing Module 945 utilizes the table of state data 590 of FIG. 6 to read characters starting at the element with the identifier. Three states (i.e., IsLT, IsStartTag and MaybeAttr) are taken into account, even though all of the characters of the three elements of fragment 625 may be read. It is noted that the Parsing Module 945 parses text of other fragments also associated with the identifier slidegroup2. Specifically, the Parsing Module 945 takes into account these characters: <, d, i, v, space, i, d, =, ", s, l, i, d, e, g, r, o, u, p, 2,"<, d, v, >, <, /, <, d, v, >, <, d, v, >, <, p, >, /, <, d, v, >, <, d, v, >, <, p, >, <, /, <, /, <, d, v, >, <, d, v, >, <, p, >, <, /, <, /, <, d, v, >, <, d, i, v, >, <, p, >, <, /, <, /, <, /. Parsing Module 945 is able to track the three states and account for these characters, instead of tracking many more states and characters, due to the XHTML.

The Parsing Module 945 generates a data structure 805, and generally finds elements at an identifier or children of an identifier. In particular, it is noted that in some embodiments, the same data structure discussed above in connection with the identifier slide1 may be utilized, as illustrated in FIG. 8. The data structure includes the identifier (e.g., slidegroup2 in node 815*b*), a start index indicating a starting character (e.g., <), an end index indicating an ending character (e.g., >), the list of children (e.g., the nearest parent with an identifier has five children with the demanded fragment being the second child out of five children in nodes 820*f*-820*j*), and the text of the elements including markup tags, such as everything in the outer div, inner div, and paragraph elements (e.g., nodes 820*f*-820*j*).

It is noted that as the identifier reflects the entire second slideshow, data about multiple fragments is saved in the data structure 805. Turning to FIG. 8, to obtain the text of the of the elements of demanded fragment 675, which corresponds with Container 5 and element 820*g* in FIG. 8, the Parsing Module 945 retrieves node 815*b* based on identifier slidegroup2 and ultimately retrieves the second child at node 820*g*, which is child index equal to 1, using the child indexes determined and stored by the Tracing Module 940. The Parsing Module 945 adds the text of nodes 820*g*, 825*i*, and 825*j* into the elements of Container 5 in the browser's tree structure for displaying demanded fragment 675 in the web page 602. It is also noted that any images or other entities referenced in the parsed text of the elements of demanded fragment 675 may have to be retrieved.

It is also noted that as the data structure 805 includes parsed text of the elements of the other fragments of the second slideshow that are non-default content items, the data structure 805 may be utilized to retrieve data if any of the following fragments are demanded: fragment 685 corresponding with Container 6/680, fragment 695 corresponding with Container 7/690, fragment 705 corresponding with Container 8/700, as well as fragment 675 corresponding with Container 5/670 if for any reason this fragment needs to be reloaded. In each of these instances, the identifier slidegroup2 and child indexes are determined and stored by the Tracing Module 940 for each demanded fragment as discussed herein above.

To elaborate further on FIG. 8, FIG. 8 shows the data structure 805, as a tree, that may be generated by the Parsing Module 945. The root node 810 has an identifier slidegroups and two children nodes, namely, node 815*a* with identifier slidegroup1 and node 815*b* with identifier slidegroup 2. These two nodes are siblings, meaning that they share a parent (e.g., node 810). Nodes 820*a*, 820*b*, 820*c*, 820*d*, and 820*e* are siblings and all share the same parent at node 815*a* with identifier slidegroup1. Although nodes 820*a*, 820*b*, 820*c*, 820*d*, and 820*e* are siblings, each of these nodes directly has its own identifier. Also in the data structure 805 are nodes 820*f*, 820*g*, 820*h*, 820*i*, and 820*j*, all of which share the same parent node 815*b* with identifier slidegroup2. However, none of these nodes directly has its own identifier. Each node 820*b*, 820*c*, 820*d*, 820*e*, 820*g*, 820*h*, 820*i*, and 820*j* has two children. Node 820*b* has children nodes 825*a* and 825*b*. Node 820*c* has children nodes 825*c* and 825*d*. Node 820*d* has children nodes 825*e* and 825*f*. Node 820*e* has children nodes 825*g* and 825*h*. Node 820*g* has children nodes 825*i* and 825*j*. Node 820*h* has children nodes 825*k* and 825*l*. Node 820*i* has children nodes 825*m* and 825*n*. Node 820*j* has children nodes 825*o* and 825*p*.

It is further noted that based on the disclosed embodiments, web page loading may be expedited as the number of requests made by a client computer to a server computer may be reduced, and specifically, reduced to two requests, to receive the data for the web page. Moreover, the parsing module utilizes three states and a data structure to expedite parsing and retrieval.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Moreover, the subject matter defined in the appended claims is not limited to implementations that solve any disadvantage and/or provide any advantage noted in this disclosure.

The invention claimed is:

1. A computer implemented method comprising:
   receiving, at a server computer, a first request from a client computer for a first content item of a web page, the first request received in response to a user request for the web page at the client computer;
   interpreting, based on the first request being an initial request for content of the web page, that the first request is for one or more default content items of the web page;
   identifying one or more default content items of the web page based on the one or more default content items being pre-classified as default content items;
   responding to the first request with the one or more default content items of the web page for display as part of the web page and without providing one or more non-default content items of the web page with the one or more default content items;
   receiving, at a server computer, a second request from the client computer for a second content item of the web page, the second request being interpreted to be a request for the one or more non-default content items of the web page and being received in response to a user interaction with the one or more default content items of the web page;
   identifying one or more non-default content items of the web page based on the one or more non-default content items being pre-classified as non-default content items; and
   responding to the second request with the one or more non-default content items of the web page for display as part of the web page.

2. The method of claim 1, wherein the one or more default content items includes substantially all content items that are classified as default content items in the response to the first request, and the one or more non-default content items includes substantially all content items classified as non-default content items in the response to the second request.

3. The method of claim 1, further comprising determining which content items of the web page are classified as default content items and which content items are classified as non-default content items based on classifications written into code for the respective content items.

4. The method of claim 1, further comprising:
   interpreting the first request to be a request for one or more default content items based on a query string of the first request; and
   interpreting the second request to be a request for one or more non-default content items based on a query string of the second request.

5. The method of claim 1, wherein the web page is divided into fragments and each fragment is a content item, further comprising responding to the second request with a plurality of fragments that are each classified as non-default content items.

6. One or more computer-readable storage media storing computer-executable instructions that are executable by a computing device to cause the computing device to perform operations comprising:
   receiving, at a receiving device, a request from a requesting device for content items of a web page as part of an initial request for the web page;
   interpreting, based on the request for content items being part of the initial request for the web page, that the request for content items is a request for one or more default content items of the web page;
   identifying individual content items of a group of content items as either a default content item or a non-default content item based on size attributes of the individual content items, with one or more default content items being identified as default content items based on the one or more default content items being smaller in size than one or more non-default content items; and
   responding to the request with the one or more default content items and without providing one or more non-default content items of the web page with the one or more default content items.

7. The one or more computer-readable storage media of claim 6, wherein said identifying individual content items of a group of content items as either a default content item or a non-default content item is further based on one or more flags that identify individual content items as either a default content item or a non-default content item.

8. The one or more computer-readable storage media of claim 6, wherein said identifying comprises comparing the individual content items to a size threshold.

9. The one or more computer-readable storage media of claim 6, wherein said identifying individual content items of a group of content items as either a default content item or a non-default content item is further based on code in the individual content items that identify the individual content items as either a default content item or a non-default content item.

10. The one or more computer-readable storage media of claim 6, wherein said identifying individual content items of a group of content items as either a default content item or a non-default content item is further based on an indication as to how quickly the individual content items are expected to load.

11. The one or more computer-readable storage media of claim 6, wherein the individual content items of the group are pre-classified as either a default content item or a non-default content item prior to receiving the request for one or more default content items.

12. The one or more computer-readable storage media of claim 6, wherein the operations further comprise:
   receiving a different request that requests one or more non-default content items of the web page; and
   responding to the different request with one or more non-default content items.

13. A system comprising:
one or more hardware-based processors;
a memory storing computer-executable instructions that are executable by the one or more hardware-based processors to cause the system to perform operations including:
receiving, at a server computer, a first request from a client computer for a first content item of a web page, the first request received in response to a user request for the web page at the client computer;
interpreting, based on the first request being an initial request for content of the web page, that the first request is for one or more default content items of the web page;
identifying one or more default content items of the web page based on the one or more default content items being pre-classified as default content items;
responding to the first request with the one or more default content items of the web page for display as part of the web page and without providing one or more non-default content items of the web page;
receiving, at a server computer, a second request from the client computer for a second content item of the web page, the second request being interpreted to be a request for the one or more non-default content items of the web page and being received in response to a user interaction with the one or more default content items of the web page;
identifying one or more non-default content items of the web page based on the one or more non-default content items being pre-classified as non-default content items; and
responding to the second request with the one or more non-default content items of the web page for display as part of the web page.

14. The system of claim 13, wherein the one or more default content items includes substantially all content items that are classified as default content items in the response to the first request, and the one or more non-default content items includes substantially all content items classified as non-default content items in the response to the second request.

15. The system of claim 13, wherein the operations further include determining which content items of the web page are classified as default content items and which content items are classified as non-default content items based on classifications written into code for the respective content items.

16. The system of claim 13, wherein the operations further include:
interpreting the first request to be a request for one or more default content items based on a query string of the first request; and
interpreting the second request to be a request for one or more non-default content items based on a query string of the second request.

17. The system of claim 13, wherein the web page is divided into fragments and each fragment is a content item, and wherein the operations further include responding to the second request with a plurality of fragments that are each classified as non-default content items.

18. The system of claim 13, wherein said identifying one or more default content items comprises identifying the one or more default content items of the web page based on the one or more default content items being flagged as default content items.

19. The system of claim 13, wherein said identifying one or more non-default content items comprises identifying the one or more non-default content items of the web page based on the one or more non-default content items being flagged as non-default content items.

20. The system of claim 13, wherein the one or more default content items of the web page are pre-classified as default content items based on a content size threshold.

* * * * *